United States Patent
Freidell

(10) Patent No.: US 8,230,819 B2
(45) Date of Patent: Jul. 31, 2012

(54) VACUUM GROOMING TOOL

(75) Inventor: James E. Freidell, Littleton, CO (US)

(73) Assignee: Hair Patrol LLC, Littleton, CO (US)

( * ) Notice: Subject to any disclaimer, the term of this patent is extended or adjusted under 35 U.S.C. 154(b) by 1192 days.

(21) Appl. No.: 11/338,221

(22) Filed: Jan. 23, 2006

(65) Prior Publication Data

US 2006/0118137 A1    Jun. 8, 2006

Related U.S. Application Data

(63) Continuation of application No. 10/147,802, filed on May 17, 2002, now Pat. No. 7,159,274.

(60) Provisional application No. 60/291,762, filed on May 17, 2001.

(51) Int. Cl.
*A01K 13/00* (2006.01)

(52) U.S. Cl. ........................................... 119/601

(58) Field of Classification Search ............... 119/601, 119/610, 614, 618, 609, 611
See application file for complete search history.

(56) References Cited

U.S. PATENT DOCUMENTS

| | | |
|---|---|---|
| 953,267 A | 3/1910 | Heffner et al. |
| 963,049 A | 7/1910 | Kenney |
| 1,859,132 A | 5/1932 | Fechtenber |
| 1,878,345 A * | 9/1932 | Suter ................ 15/367 |
| 1,901,866 A | 3/1933 | Bryan |
| 1,936,369 A | 11/1933 | Riebel et al. |
| 2,219,802 A | 10/1940 | Bjorkman |
| 2,228,091 A | 1/1941 | Smith |
| 2,276,886 A | 3/1942 | Smith |
| 2,367,437 A | 1/1945 | Salt |
| 2,421,958 A | 6/1947 | Moretti |
| 2,523,201 A | 9/1950 | Travis |
| 2,715,240 A | 8/1955 | Pieper et al. |
| 2,780,829 A | 2/1957 | Cohen |
| 2,953,808 A | 9/1960 | Carmack |
| 3,002,215 A | 10/1961 | MacFarland |

(Continued)

FOREIGN PATENT DOCUMENTS

DE    497 159 C    5/1930

(Continued)

OTHER PUBLICATIONS

Central Cleaning Beam Systems, The Short Cut Salon Vacuum System, Date Unknown, 2 Pages.

(Continued)

*Primary Examiner* — Monica Williams
(74) *Attorney, Agent, or Firm* — Mark P. Stone

(57) ABSTRACT

A vacuum grooming tool is disclosed that includes a vacuum nozzle attachable to a vacuum source and has a hollow body with a mouth opening. A grooming device selected from a variety of standard animal grooming hand tools, such as a shedding blade, rake or de-matting tool, may span the mouth opening. The grooming device is positioned such that the airflow created by the vacuum source flows over at least one side of the grooming device. A vacuum cleaning tool for removing any animal hair from a grooming tool is also disclosed. A vacuum plenum of the cleaning tool is attachable to a vacuum source and has an opening for cleaning the grooming tool in one pass. The cleaning tool can be mounted on a stationary support may also include a pivot-action mechanism that connects the vacuum grooming tool or the cleaning tool to the vacuum source.

29 Claims, 13 Drawing Sheets

U.S. PATENT DOCUMENTS

| | | | |
|---|---|---|---|
| 3,065,491 | A | 11/1962 | Amador |
| 3,308,500 | A | 3/1967 | Woodruff |
| 3,538,533 | A | 11/1970 | Woods |
| 3,574,885 | A | 4/1971 | Jones |
| 3,668,736 | A | 6/1972 | Loscalzo |
| 3,685,089 | A | 8/1972 | Lagerstrom |
| 3,708,824 | A | 1/1973 | Holubinka |
| 3,744,082 | A | 7/1973 | Marshall |
| 3,771,192 | A | 11/1973 | Zaleski |
| 3,771,193 | A | 11/1973 | Hageal |
| 3,787,920 | A | 1/1974 | Evans et al. |
| 3,797,066 | A * | 3/1974 | Zaidan ............ 15/369 |
| 3,800,359 | A | 4/1974 | Howard et al. |
| 3,816,872 | A | 6/1974 | Bayless et al. |
| 3,818,540 | A | 6/1974 | Martinec et al. |
| 3,955,238 | A | 5/1976 | Remijas |
| 3,965,527 | A | 6/1976 | George |
| 4,040,390 | A | 8/1977 | Rosenbaum |
| 4,042,995 | A | 8/1977 | Varon |
| 4,052,249 | A | 10/1977 | Bruce et al. |
| 4,087,879 | A | 5/1978 | Spence |
| 4,123,800 | A | 10/1978 | Mazzei |
| 4,156,298 | A | 5/1979 | Spence |
| 4,190,924 | A | 3/1980 | Nicholson |
| 4,218,806 | A | 8/1980 | Cohn |
| 4,630,329 | A | 12/1986 | Shores |
| 4,656,687 | A | 4/1987 | Wei |
| 4,799,457 | A | 1/1989 | Gordon |
| 4,904,988 | A | 2/1990 | Nesbit et al. |
| 4,947,799 | A | 8/1990 | Parker |
| 5,067,044 | A | 11/1991 | Mallick, Jr. et al. |
| 5,067,444 | A | 11/1991 | Parker |
| 5,088,199 | A | 2/1992 | Romani |
| 5,095,853 | A | 3/1992 | Kruger |
| 5,211,131 | A | 5/1993 | Plyler |
| 5,435,327 | A | 7/1995 | Ho |
| 5,491,870 | A | 2/1996 | Holmes |
| 5,518,020 | A | 5/1996 | Nowicki et al. |
| 5,655,481 | A | 8/1997 | Trahan |
| 5,674,312 | A | 10/1997 | Mazzei |
| 5,678,593 | A | 10/1997 | Lockhart |
| 5,768,747 | A | 6/1998 | Smith |
| 5,863,128 | A | 1/1999 | Mazzei |
| 5,870,851 | A | 2/1999 | Shoemaker |
| 5,881,462 | A | 3/1999 | Romani |
| 5,904,196 | A | 5/1999 | Wickers |
| 5,922,139 | A | 7/1999 | Gilbert |
| 5,924,202 | A | 7/1999 | Romani |
| 5,944,031 | A | 8/1999 | Farley et al. |
| 6,055,938 | A | 5/2000 | Klein |
| 6,230,659 | B1 | 5/2001 | Karlsson et al. |
| 6,293,294 | B1 | 9/2001 | Loeb et al. |
| 6,571,478 | B1 | 6/2003 | Romani et al. |
| 6,718,913 | B1 | 4/2004 | Stupar |
| 6,732,676 | B1 | 5/2004 | Smith |
| 6,782,846 | B1 | 8/2004 | Porter et al. |
| 6,834,619 | B1 | 12/2004 | Rampersad |
| 6,874,446 | B2 | 4/2005 | Plante et al. |
| 6,925,728 | B2 | 8/2005 | Busa et al. |
| 6,935,276 | B2 | 8/2005 | Powers |

FOREIGN PATENT DOCUMENTS

| | | |
|---|---|---|
| DE | 971 687 C | 3/1959 |
| DE | 297 15 247 U | 10/1997 |
| FR | 2 583 260 A | 12/1986 |
| GB | 283 988 A | 1/1928 |

OTHER PUBLICATIONS

Central Cleaning Beam Systems, Beam Short Cut Salon Vacuum System Installation Instructions, 1996, 6 Pages, Beam Industries and VacuKeen Developments, Inc.

Rockler Woodworking and Hardware, Ecogate Balast Gate System, 2001, 1 Page, www.rockler.com, Rockier Companies, Inc.

Schlosser Tool & Machinery, Model W1049—Woodstock Dust Collection Separator, 1 Page, Date Unknown, www.schlossertool.com.

Woodstock International, Inc., Dust Collection Separators—W1049, W2049, W2046, 1 Page, www.woodstockinternational.com.

Ecogate, Inc., Ecogate System, Energy Saving Dust Collecting Systems—Ecogate Master System, Ecogate System, 3 Pages, 2001, www.ecogate.com.

Hanvey Specialty Engineering, ArtMaster Elite System, Engineered, Industrial Quality, Clipper Vacuum Systems, Clipper Vac Compared to ArtMaster, Date Unknown, 2 Pages, www.shelby.net.

Hanvey Specialty Engineering, ArtMaster Junior, Engineered, Industrial Quality, Clipper Vacuum Systems, Clipper Vac Compared to ArtMaster, Date Unknown, 5 Pages, www.shelby.net.

Hanvey Specialty Engineering, ArtMaster Ultra Quiet, Ultra-Lite, ArtMaster, Clipper Vacuum System—Upgrade Your Clipper Vac System, ArtMaster, Engineered, Industrial Quality, Clipper Vacuum Systems, Date Unknown, 9 Pages, www.shelby.net.

Hanvey Specialty Engineering, TaxiVac, ArtMaster, Engineered, Industrial Quality, Clipper Vacuum Systems, Date Unknown, 2 Pages, www.shelby.net.

Hanvey Specialty Engineering, ArtMaster Central Systems, Clipper Vac Compared to ArtMaster, ArtMaster, Engineered, Industrial Quality, Clipper Vacuum Systems, Date Unknown, 3 Pages, www.shelby.net.

Hanvey Specialty Engineering, ArtMaster Housekeeping System Options for Clipper Vacuum Systems, Stop Buying All of Those Loud Shop Vacuums, ArtMaster, Engineered, Industrial Quality, Clipper Vacuum Systems, Date Unknown, 2 Pages, www.shelby.net.

Rheem Manufacturing Company Corporation, MDC Romani Inc. CV = Clipper-Vac, Date Unknown, 1 Page.

MDC Romani, Inc., Clipper VAC Systems, 1999, 6 Pages, www.clippervac.com.

MDC Romani, Inc., Clipper.Vac—Clipper Attachments, Date Unknown, 2 Pages, www.clippervac.com.

MDC Romani, Inc., Clipper Vac—Clipper Vac Product Directory, Date Unknown, 4 Pages, www.clippervac.com.

Find a Groomer, Inc., Shedding Controls—Dog Grooming Basics 101 for Pet Groomers, 1997-2005, 3 Pages, www.petgroomer.com.

Find a Groomer, Inc., Brushing & Combing—Dog Grooming Basics 101 for Pet Groomers, 1997-2005, 4 Pages, www.petgroomer.com.

Find a Groomer, Inc., Matted & Tangled Coats—Dog Grooming Basics 101 for Pet Groomers, 1997-2005, 4 Pages, www.petgroomer.com.

Furminator, Inc., About the Treatment—FURminator, Shed-Less Treatment, Date Unknown, 2 Pages, www.furminator.com.

Furminator, Inc., How It Works—FURminator, Shed-Less Treatment, Date Unknown, 1 Page, www.furminator.com.

Barbara Bird, Grooming—Techniques of Dematting, Pet Services Journal, Jul. 2004, pp. 32-34, 38.

Groomer to Groomer, Just Ask Judy, Jul. 2001, p. 8, 10 and 12.

Petedge (formerly New England Serum Company), Winter 2005 Catalog.

* cited by examiner

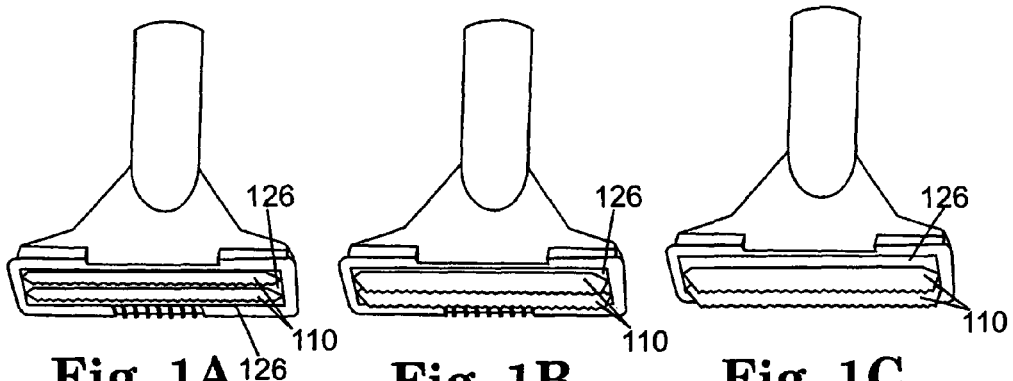
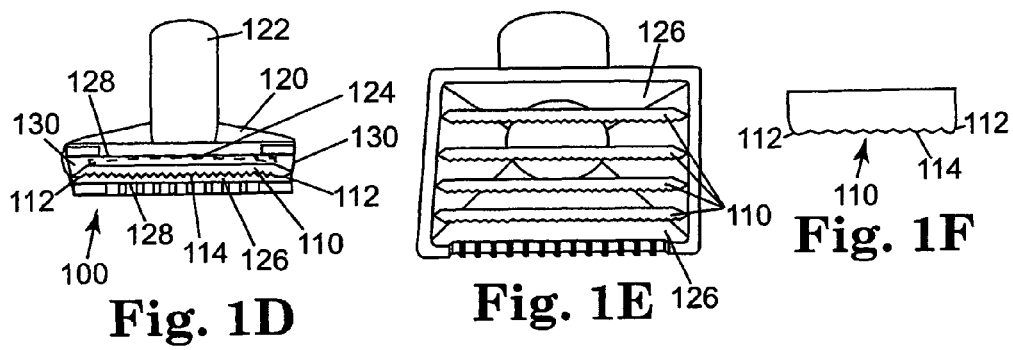
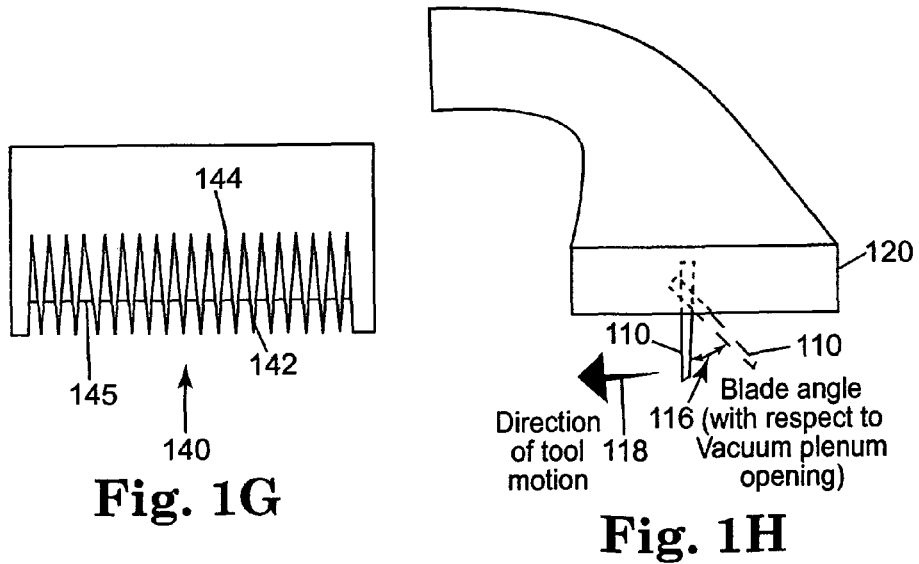

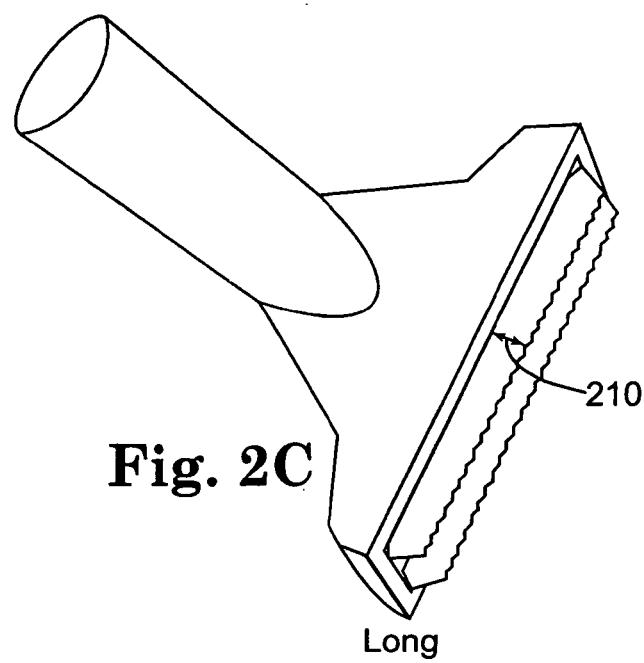
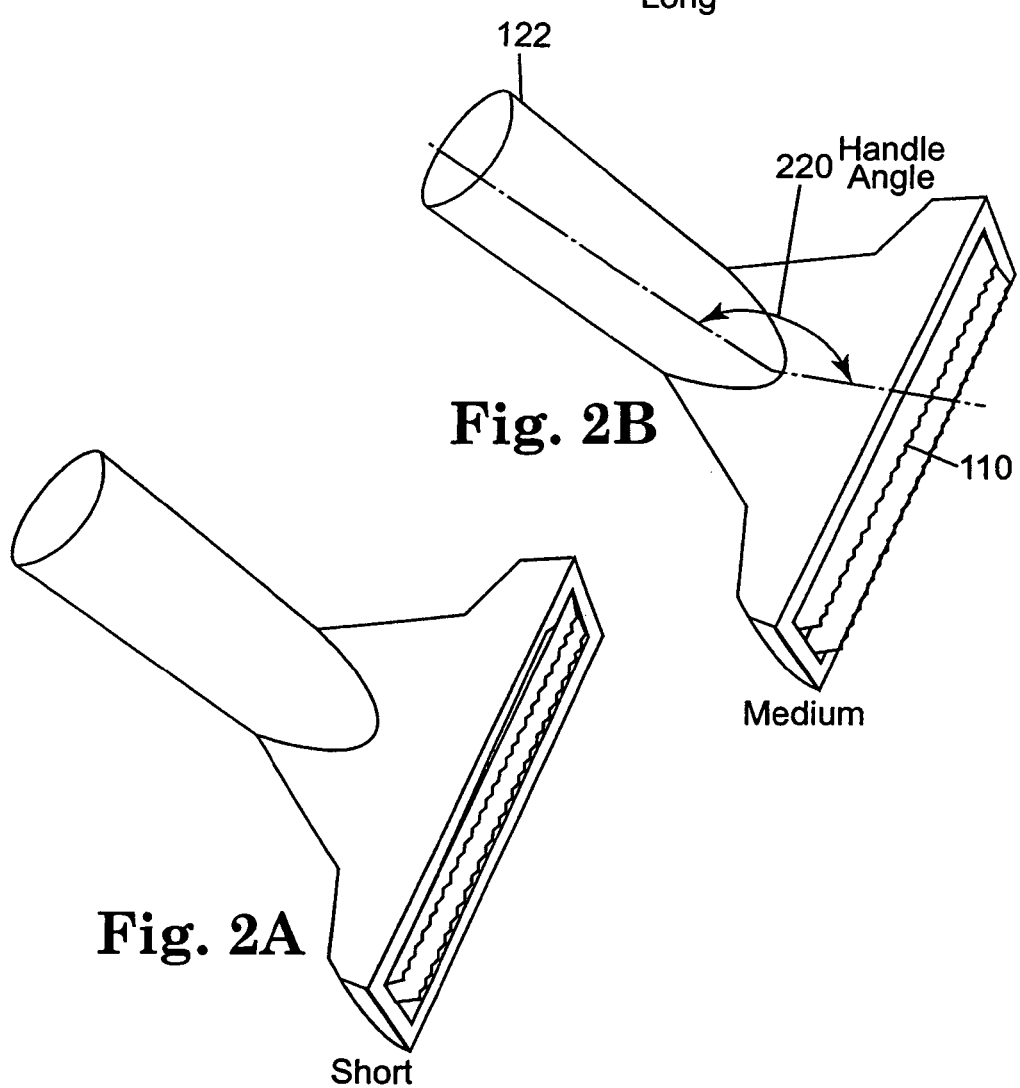

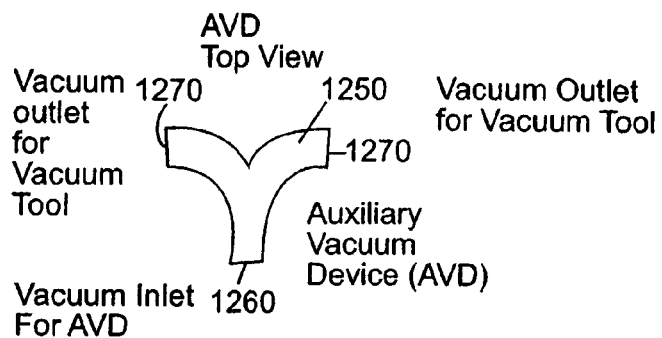
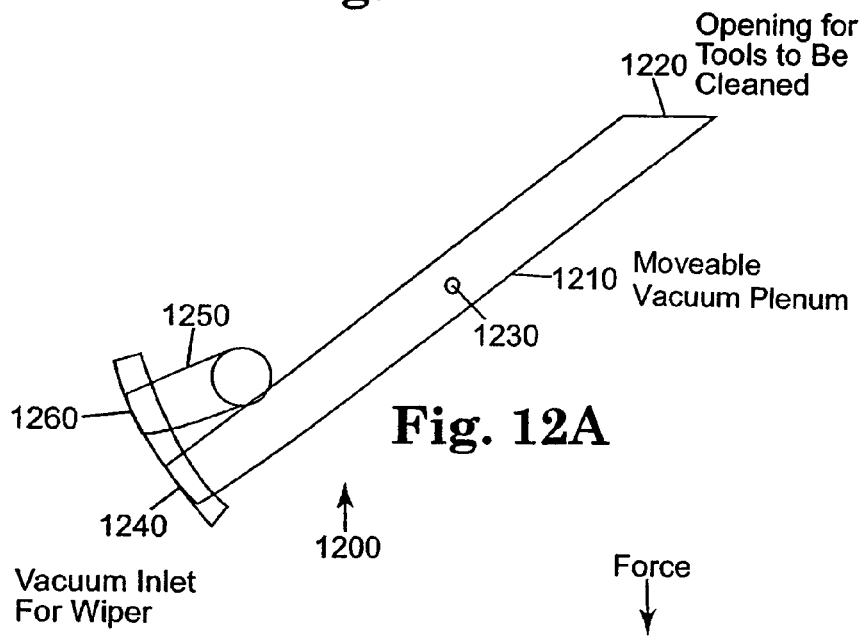
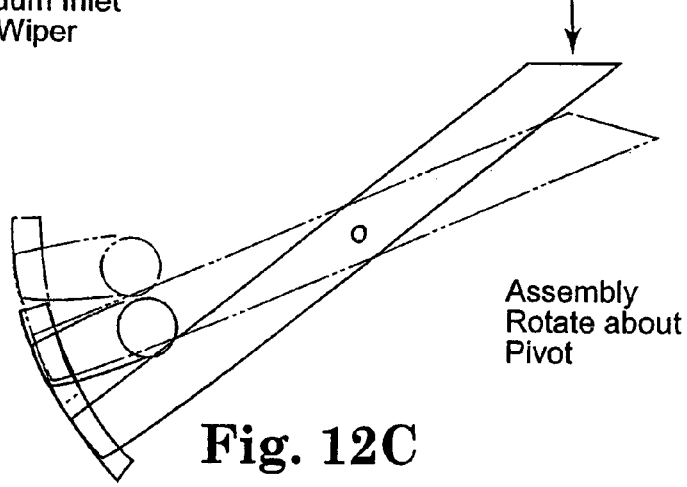

VACUUM GROOMING TOOL

CROSS REFERENCE TO RELATED APPLICATION

The present application is a continuation of U.S. Utility patent application Ser. No. 10/147,802, filed May 17, 2002 which claims the benefit of U.S. Provisional Application No. 60/291,762 filed May 17, 2001, both of which are hereby incorporated by reference in their entirety.

FIELD

The present invention relates generally to animal grooming tools and more particularly to animal grooming vacuum tools.

BACKGROUND

Professional animal groomers deal with a large amount of hair during the grooming process. Hair accumulates on the grooming table, floor, and in the bathing tub. Much of this hair is introduced into the air environment as a result of blow drying, hair stripping, brushing, combing, raking, clipping, shearing, de-shedding, carding, and de-matting operations. Much of this hair is physically handled by the groomer as he/she manually removes accumulated hair from various hand tools such as slicker brushes, combs, and rakes. In this latter case, the groomer must use both hands and either drops extracted hair on the floor or deposits such into a waste receptacle. During the bathing process, an abundance of animal hair often finds its way into the drain causing frequent blockage. Most professional grooming shops have plumbing professionals clean shop bathing drains as frequently as every two weeks as a precautionary measure.

Many states employ licensing and/or regulations requiring that animal hair be cleaned up after grooming each animal before another can be groomed at the same workstation. In practice, either hair accumulates on the floor until which time as the groomer decides it must be cleaned up, or it is cleaned up after each animal. Most professional groomers use a standard wet/dry vacuum to accomplish this clean-up operation. Fewer perform such clean-up with brush, broom and dustpan. The environment containing accumulated hair, dander and pests is recognized as unhealthy for both humans and animals. Airborne hair and dander is one way of transmitting skin ailments and disease between animals, and allergens to humans, confined in closed spaces.

Clean-up time can be a substantial portion of the total time allocated to groom an animal. Most grooming business advisors espouse the need to continuously maintain as clean as possible a grooming environment to appease discerning customers.

Professional groomers often suffer from carpal tunnel syndrome, tendonitis, and other maladies resulting from repetitive motion, particularly repetitive motion that involves strain due to weight or resistance to such motion. Anything that can reduce the number of repetitions and/or relieve strain, particularly in using common hand tools, can reduce the incidence and severity of such maladies.

Pet owners often must deal with volumes of hair naturally shed by many animals. This shed hair accumulates around the home during shedding season, creating a general nuisance and requiring more frequent home vacuuming and cleaning.

One of the problems faced by all groomers is the accumulation of hair on their hand tools (combs, rakes, brushes, etc.) during use. FIG. 9(A) shows a slicker brush before use, and FIG. 9(B) after use. Groomers normally use their free hand to remove the hair (and with slicker brushes in particular, presents a relatively arduous, repetitive task). FIG. 9C illustrates that even rakes and combs are affected.

SUMMARY

The present invention discloses a system of tools which, when attached to a vacuum source, reduces the need for the tool user (groomer) to manually deal with animal hair accumulating on or in such tools during use, or manually clean up hair displaced from the animal during the grooming process. Certain of these tools are used with standard professional grooming hand tools. Others integrate vacuum plenums into and with standard professional grooming tool functionality. Others yet facilitate the drying of animals. These tools also reduce exposure to animal dander and pests often found in animal coats.

Features of this system of tools and/or individual tools (as applicable) include:
1. aerodynamic design to allow operation under vacuum application without significantly contributing to environmental noise;
2. ergonomic design to be lightweight and comfortable to use;
3. increased efficiency, compared to common grooming tools that the invention replaces, as measured in the amount of hair extracted per operational stroke and/or the elimination of operational strokes, both of which can directly translate to reduction of repetitive motion actions and the amount of time required to groom an animal;
4. the ability to automatically capture most animal hair, dander, and pests that otherwise would be released in the environment as a result of the grooming process;
5. designs comparable to the professional hand tools the invention replaces in their ability to properly accommodate animal body contour(s) and varying types of animal hair;
6. the ability to use such tools with a single hand, allowing the groomer the ability to always keep one hand on the animal being groomed;
7. reduction of time devoted to animal drying after bathing;
8. reduction of the amount of hair introduced into bath drains and thereby reducing the incidence of drain clogging resulting from animal bathing;
9. reduction of the acoustic noise environment, particularly during blow drying and clean-up, either in sound pressure level (intensity) reduction or time of exposure to such, or both; and
10. design of certain tools to be usable by animal owners employing a standard home vacuum cleaner (upright or canister) as the vacuum source.

BRIEF DESCRIPTION OF THE DRAWINGS

Other objects and advantages of the invention will become apparent upon reading the following detailed description and upon reference to the drawings in which:

FIG. 1 shows a set of embodiments of the invention in which the vacuum grooming tool includes shedding blade(s);

FIG. 2 shows the grooming tools shown in FIGS. 1(A), 1(B) and 1(C), respectively, in a different perspective;

FIGS. 12 and 13 show an articulated cleaner according to an aspect of the invention.

DETAILED DESCRIPTION OF SPECIFIC EMBODIMENTS

Figure 3C:
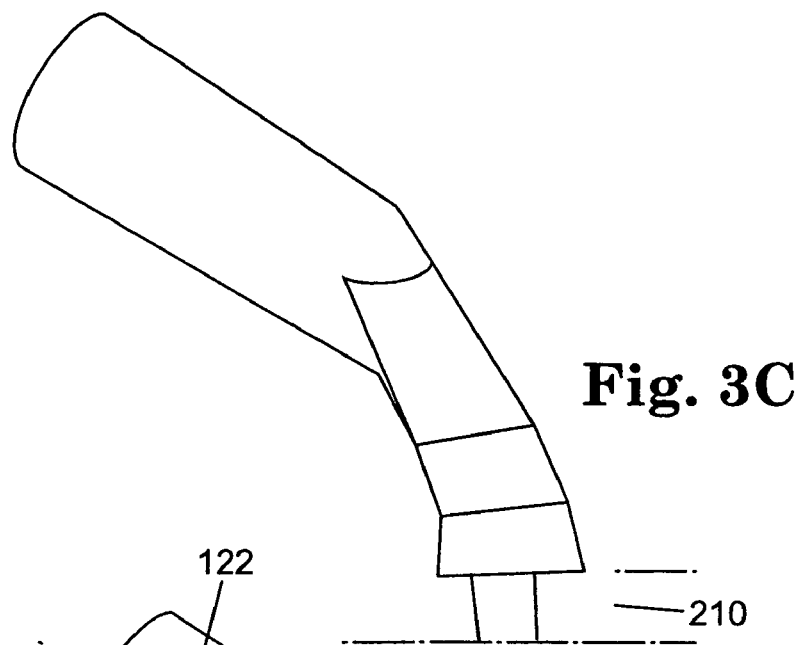
FIG. 3 shows a side view of the grooming tools shown in FIG. 2.

FIG. 1D depicts an animal grooming vacuum tool 100 having an integrated shedding tool blade 110. The device has a suction nozzle 120 having an integrally formed suction pipe 122 to connect to a source of negative pressure (such as a vacuum). The suction pipe 122 is in physical communication with a hollow body 124 terminating in an integrally formed mouth opening 126. In the preferred embodiment, the mouth 126 is substantially rectangular and is defined by a first pair of integrally formed spaced rectangular walls 128 which are substantially parallel to each other and a second pair of integrally formed spaced rectangular walls 130 which are substantially parallel to each other.

The apparatus has one or more substantially straight stainless steel grooming blades 110, illustrated in more detail in FIG. 1(F), disposed within the rectangular mouth opening. Each blade 110 has two shaped and smoothed ends 112, each end is attached to one of the second pair of integrally formed spaced rectangular walls 130. Each blade also has a serrated edge 114 extending outside the plane of the rectangular mouth opening 126. In multiple blade implementations, such as those schematically shown in FIGS. 1(A), 1(B), 1(C) and 1(E) each blade 110 is substantially parallel to the other blades 110 and to the first pair of integrally formed spaced rectangular walls. In addition, the blades 110 are positioned to provide an air passage extending from the mouth opening 126 into the hollow body portion 124 of the nozzle 120 between each of the blades 110 and between the blades 110 and the first pair of integrally formed spaced rectangular walls 128. Better results are achieved if the animal hair can be sucked down from both sides of the blade 110.

Although the mouth 126 of the preferred embodiment is rectangular, those skilled in the art will recognize that other mouth shapes such as ovals may be used, so long as the blades 110, in multiple blade devices, are substantially parallel to each other.

Each blade 110 can be attached to the mouth opening 126 in a variety of ways. For example the blades 110 can be glued to the walls using commercially available epoxies. For additional stability, receiving slots can be cut in the nozzle housing to receive the ends of each blade 110 or the entire edge of the blade 110 opposite the serrated teeth 114.

Blades 110 may be constructed out of stainless steel or a plastic blade may be used provided the mold for the serrated edges of such (or post molding operations) give rise to sharp edges. The ends 112 of the blades are shaped (and may be smoothed) in order to minimize sharp corners which could cut or scrape an animal's skin when used. These tools are designed to be pushed or pulled on the animal's coat, not side-to-side, which could injure the coat or underlying skin.

The blade can be formed from a substantially straight piece of the toothed metal, as opposed to trying to maintain a curve in the metal blade. The blade can be integrated with an upholstery nozzle that does not have bristles. The blade can also take the form of any manual shedding blade. For example, in the embodiment illustrated in FIG. 1(G), the blade 140 has faceted teeth 142 with sharply angled channels 144 between the teeth 142 and sharp edges 145 for pulling hair. A blade similar to a hair clipper blade, with teeth that have cutting edges, can also be used.

As illustrated in FIG. 1(H), the orientation of the blade(s) can be set at an angle 116 relative to the direction of tool motion 118 during the intended normal use. Typically, the tool is moved in a direction substantially perpendicular to the rim of the mouth opening 126 so that the vacuuming action is the most efficient. The blade can be perpendicular to the tool motion, or deviate from the perpendicular orientation by an angle 116. Typically, the blade is perpendicular or angled away from the tool motion 118.

Figure 3B:
Figure 3A:
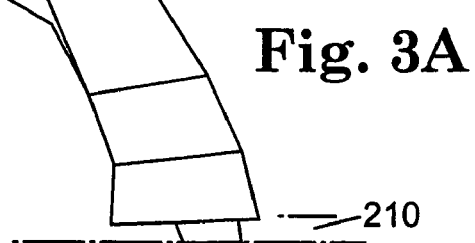

FIGS. 2(A), 2(B) and 2(C) as well as FIGS. 3(A), 3(B) and 3(C) depict, respectively, blades having different heights 210, depending upon the type of animal's coat to be groomed. The angle 220 between the hose attachment point (i.e., suction pipe 122, which serves as the handle) and blade(s) 110 may vary according to customer preference and/or ergonomic design considerations. In the preferred embodiment the blade protrudes between ⅛" to ⅝" from the mouth of the nozzle.

The blade could also be mechanically secured to the mouth using a clip or other fastener. Those skilled in the art will recognize that using a mechanical mechanism allows blades to be exchanged.

The present invention will operate with commercially available wet/dry and standard vacuum cleaners. The greater suction of the wet/dry vacuum (compared to the upright or canister vacuum) tends to be more effective in lifting the animal's coat (its hair), almost to the point of standing upright within the vacuum tool. Nevertheless, care should be taken to ensure that too much suction is not used. In the event a strong vacuum is used, an adjustable vacuum suction hose can be used to reduce the vacuum pressure.

Other means can be used to reduce suction. For example, a vacuum with a variable-speed motor drive can be used to create variable suction; a vent, with or without a valve, can also be placed on the grooming tool itself.

Adequate CFM and vacuum pressure is important. In the preferred embodiment, the vacuum pressure should be at least 40 inches of water at or above 90 CFM. Tools may be fabricated with smaller vacuum orifices to accommodate less powerful vacuum cleaners. Similarly, larger tools designed for horses and similar large animals may operate best with greater vacuum pressure and airflow.

FIGS. 1, 2 and 3 show several tools incorporating shedding tool functionality into a vacuum nozzle. The number of blades and overall tool size varies depending upon the type and size of animal, and the characteristics of the animal's hair. For example, Tool E in FIG. 1 is sized for horses and other large animals. The length of the blade 110 is typically a few inches in the preferred embodiment, but may be built larger or smaller to suit the intended use. An example of where a smaller tool may be of value would be one for small dogs and particularly legs of dogs generally. For such a purpose, a tool approximately 1 to 2 in. wide may prove most useful.

Figure 4:
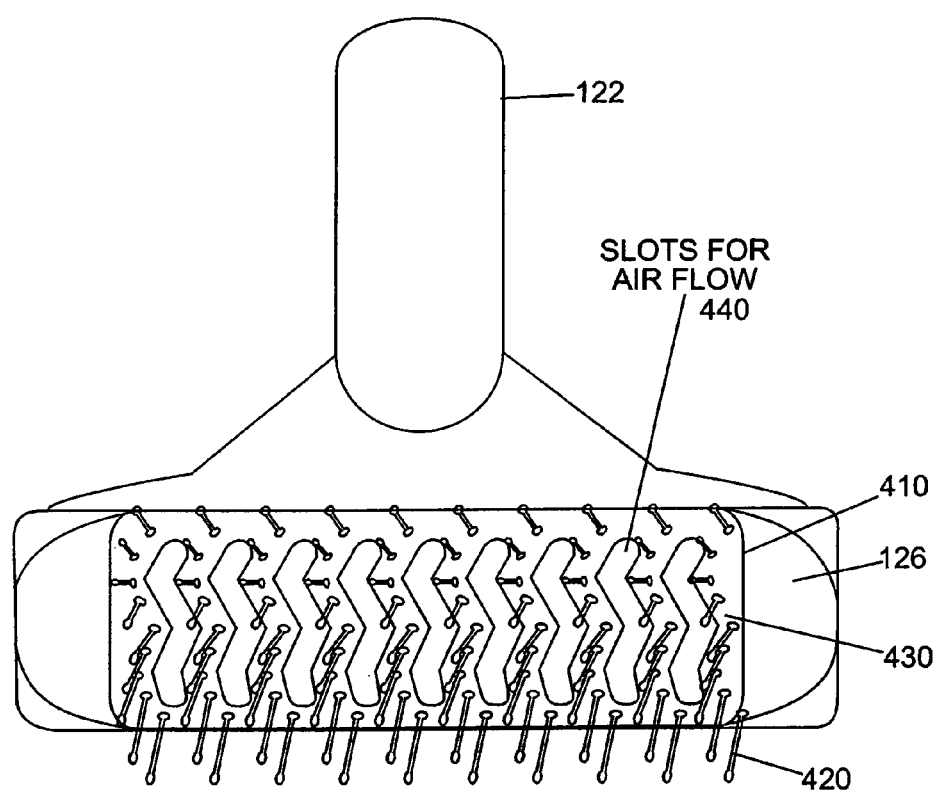
FIG. 4 shows another embodiment of the invention, in which the grooming tool includes a brush.

FIG. 4 discloses an alternate embodiment using a pin brush 410 instead of one or more blades. The pin brush 410 has a large number of plastic or metal wire pins 420 held by base 430. Base 430 may be rigid or flexible. The pins allow air flow from a vacuum to suck hair through the slots 440 formed in the base 430 and the mouth 126 of the device.

The slot configuration of this design also aids blow drying. The slots 440 allow airflow created by the vacuum to help suck hair (and fleas, ticks, dirt, etc.) up into the brush while brushing and to evacuate loosened hair and moisture. Note that hair may wrap around the brush pins (more than the shedding blade) and require additional procedures to remove the hair. Airflow may be induced in reverse (connected to the blower output of a vacuum cleaner for example) to further aid blow drying while brushing the animal.

Those skilled in the art will recognize that the slot size, shape, number and length of pins may all vary depending on the animal's hair length and the required amount of brushing or drying assistance. Overall size may also vary depending on the size of the animal. Instead of brush pins, bristles can also be used in the embodiment shown in FIG. 4.

Figure 5A:
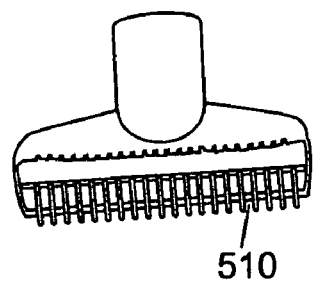
FIG. 5 shows another set of embodiments of the invention, in which the grooming tool includes a comb.
Figure 5B:
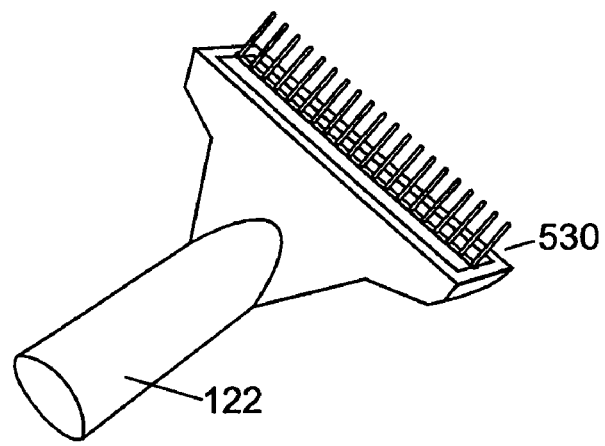
Figure 5C:
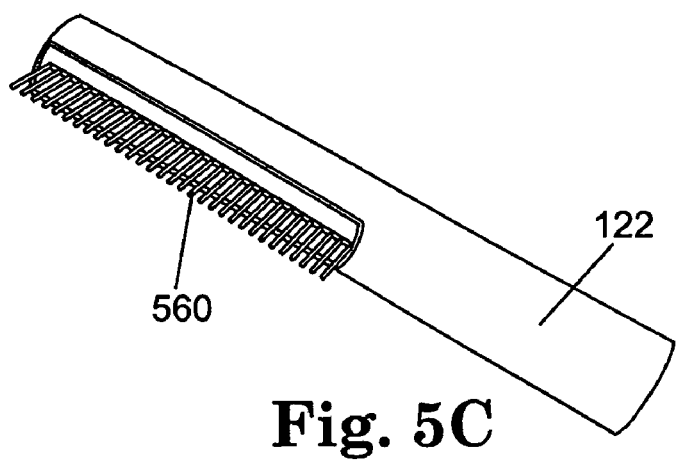

FIG. 5 discloses an alternate embodiment using combs 510, 530 and 560 instead of a blade. Three styles of vacuum combs are shown, respectively. Two (FIGS. 5(A) and 5(B)) of the depicted embodiments are intended to be used like a rake (moved fore and aft). Pulling the rake works better than pushing. The third vacuum comb (FIG. 5(C)) is designed to be used more like a traditional comb (moved sideways).

In all cases, airflow (created by vacuum) flows around both sides of the comb to suck hair up into the comb and evacuate loosened hair (along with dirt, dander, fleas, ticks, etc.). The combs may be constructed of metal or plastic. Comb length and pitch (number of teeth per inch), may be varied according to personal preference and the type and length of hair on the animal to be groomed. Hair will accumulate in the teeth during use, requiring removal. Size may vary also (length of teeth) depending on personal preference and the size of the animal.

Figure 6A:
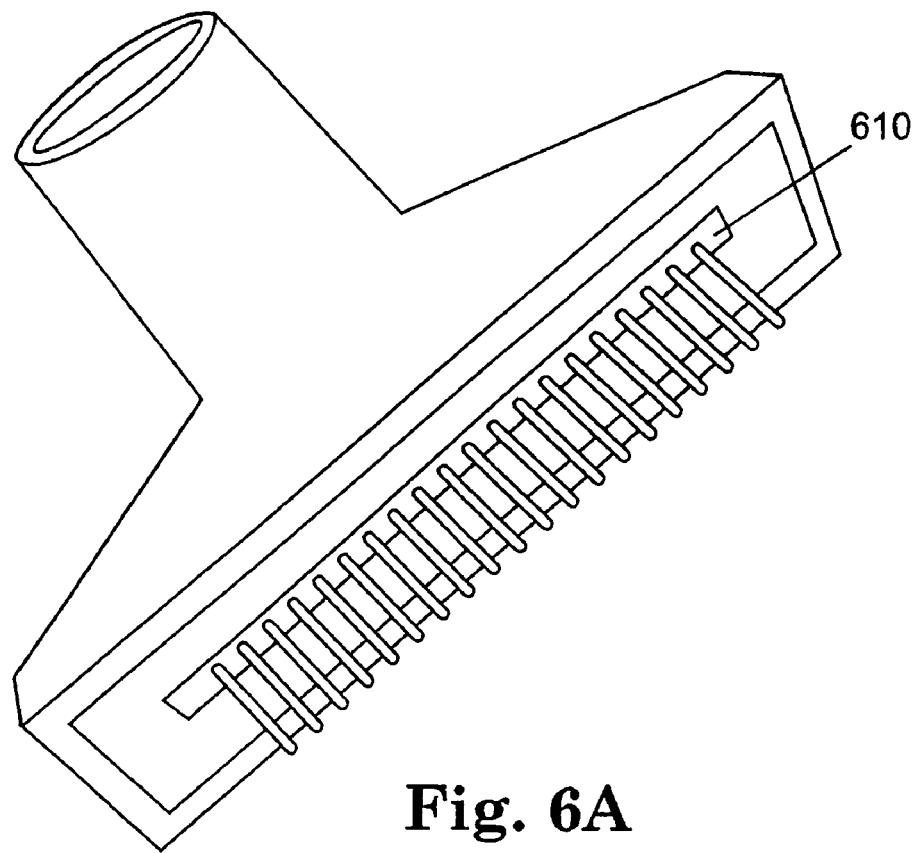
FIG. 6(A) shows another embodiment of the invention, in which the grooming tool includes a rake.
Figure 6B:
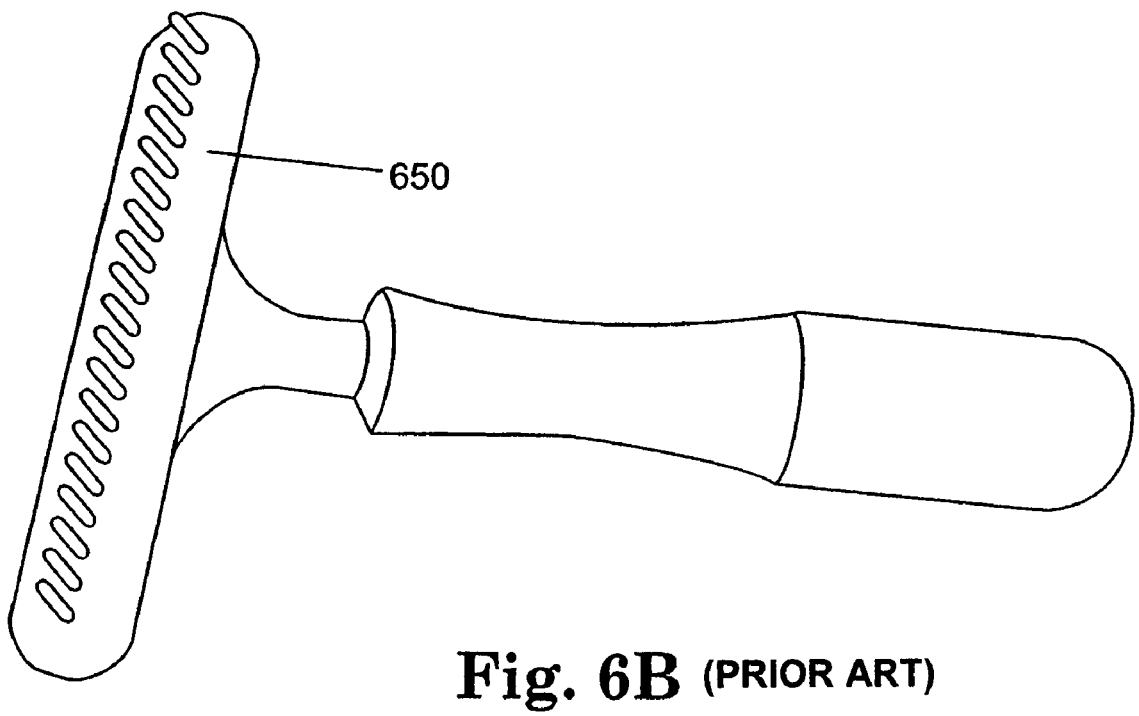
FIG. 6(B) shows a conventional grooming rake.
Figure 7:
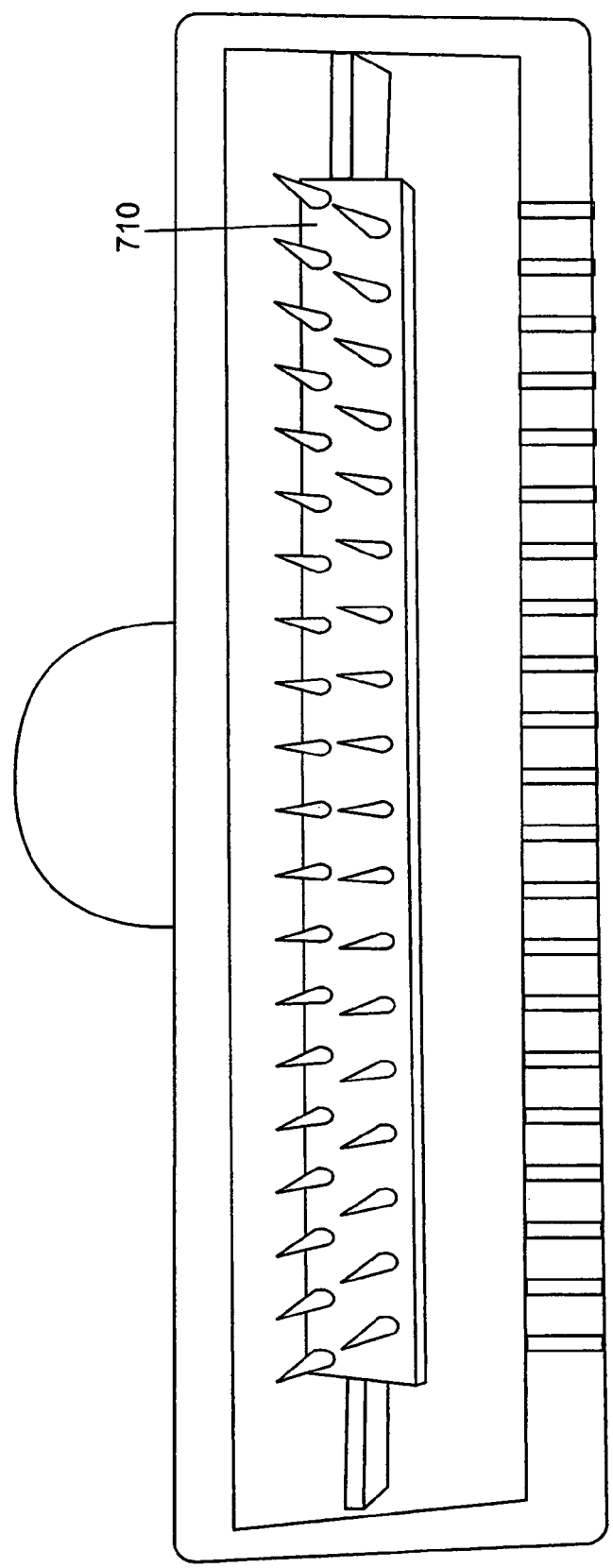
FIG. 7 shows another embodiment of the invention, in which the grooming tool includes a rake.

FIGS. 6(A) and 7 depict rakes 610 and 710, respectively, of embodiments of the present invention. Conventional rakes, such as the one 650 shown in FIG. 6(B), are used for some dog breeds. FIG. 7 shows a double row rake 710 integrated into a vacuum hand tool, creating a vacuum rake in accordance with an embodiment of the present invention. Shown in FIG. 6(A) is a single row Teflon coated rake according to an embodiment of the invention. Again, vacuum causes airflow around the rake so to suck up hair, dirt, fleas, ticks, etc. into the tool. Preferably, air flow would also flow between the rows of the double row rake 710. The devices were made using metal rakes (some Teflon coated), but can be made of any suitable material, such as metal and plastic. The number of teeth, pitch, length of rake, and length of rake tangs may vary, according to the preferences of the user and breed of animal to be groomed. The rake tangs could be made of plastic. In use, hair will build up in the tangs, requiring removal.

Figure 8B:
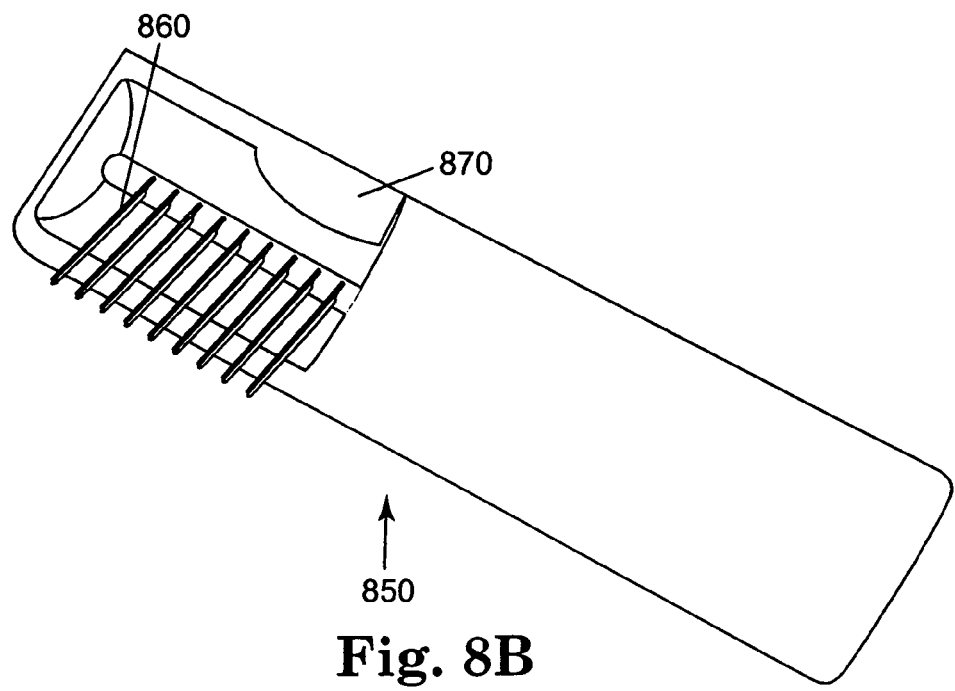
FIG. 8 shows another embodiment of the invention, in which the grooming tool includes a de-matting tool.
Figure 8A:
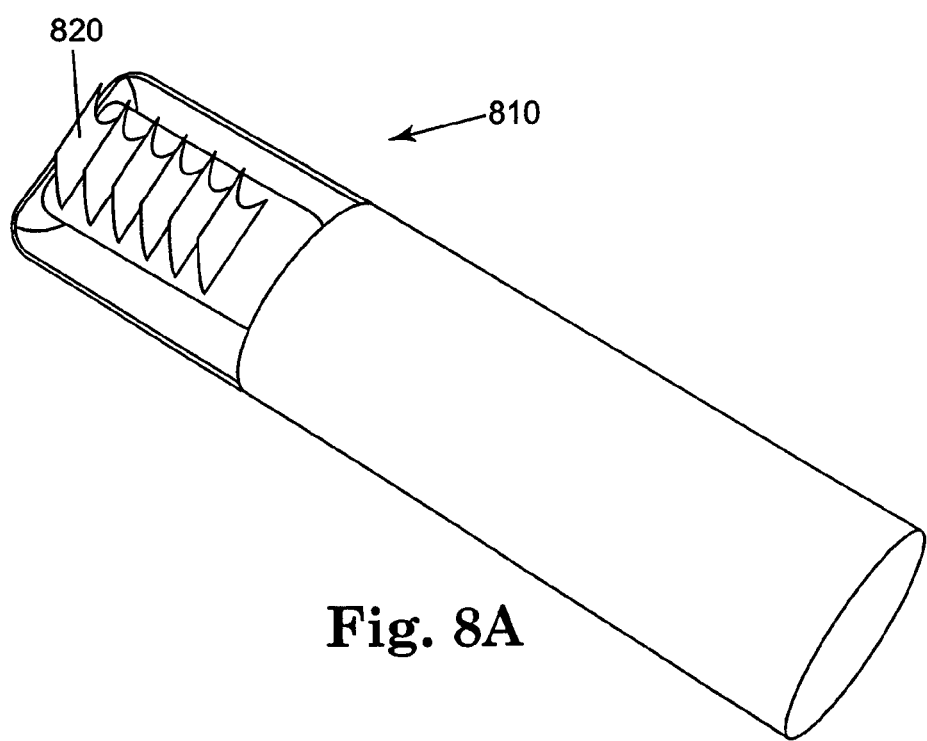

FIG. 8 depicts two vacuum de-matting tools. De-matting tools usually have replaceable blades 820, 860 that are very sharp for cutting hair. The purpose is to cut through hair mats, somewhat shredding such in order to allow a comb to effectively run through the hair. Blades are replaceable in both cases but need not be in either. According to one embodiment, air (from the vacuum) flows around both sides of the blades 820, 860 (the cutting and non-cutting edges), and in one case between the blades 860. A thumb rest 870 is shown on the embodiment illustrated in FIG. 8(B). Blades are reversible to accommodate both right and left-handed users. Blades might be made of plastic. Cut hair may accumulate in the blades during use, requiring removal.

Figure 9E:
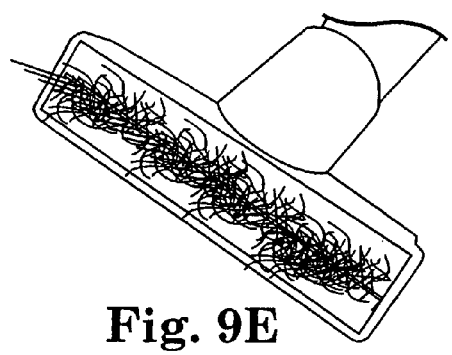
FIGS. 9(D) and 9(E) show examples of the vacuuming grooming tools according to the invention in their condition after use.
Figure 9C:
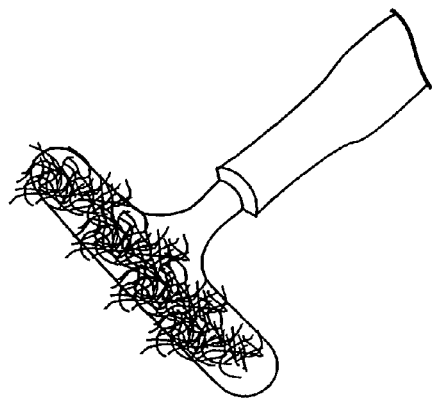
FIGS. 9(A), 9(B) and 9(C) show examples of conventional grooming tools.
Figure 9D:
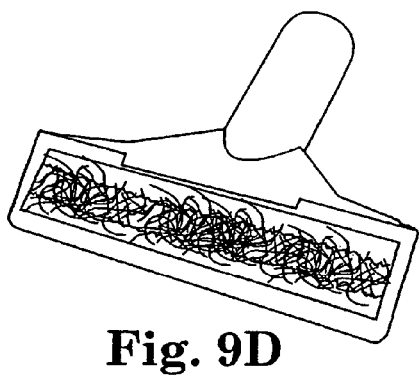
Figure 9B:
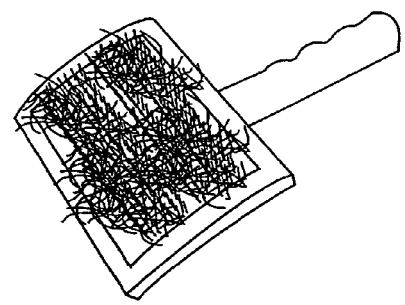
Figure 9A:
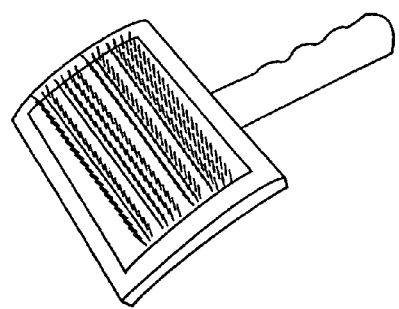

As mentioned above, and illustrated as examples in FIGS. 9(D) and 9(E), the animal hair may accumulate in the tool of the invention during use. FIG. 10 through 13 depict devices that are used to remove accumulated hair from tools during use, thereby eliminating the need for using ones fingers to do so.

Figure 10A:
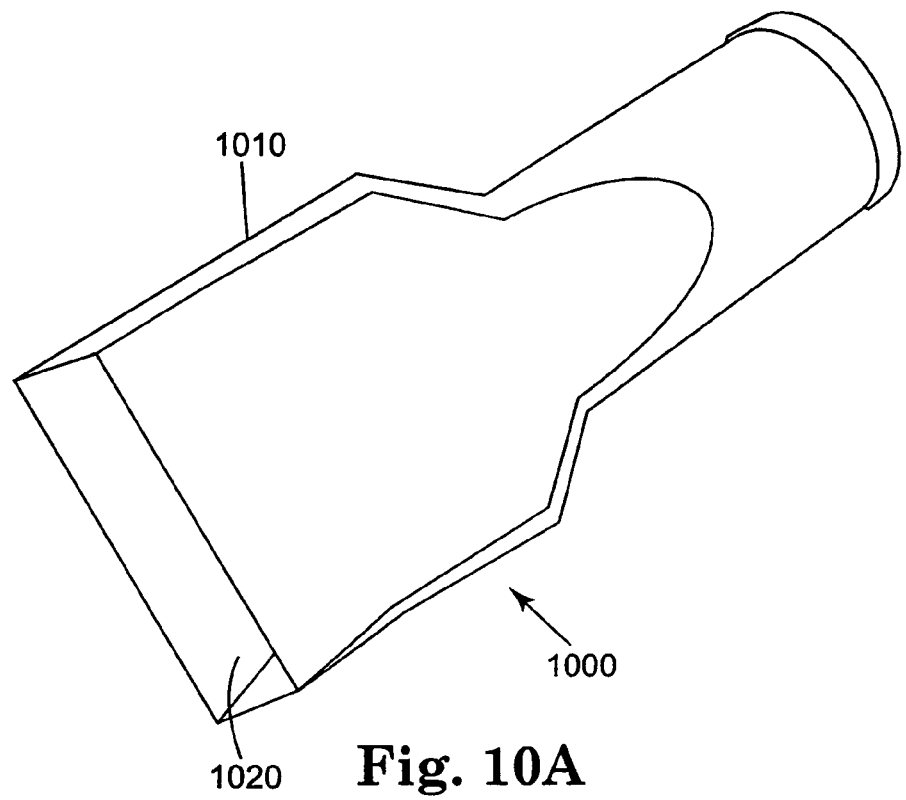
FIGS. 10 and 11 show a grooming tool cleaner according to the invention and examples of various uses of the cleaner.
Figure 10B:
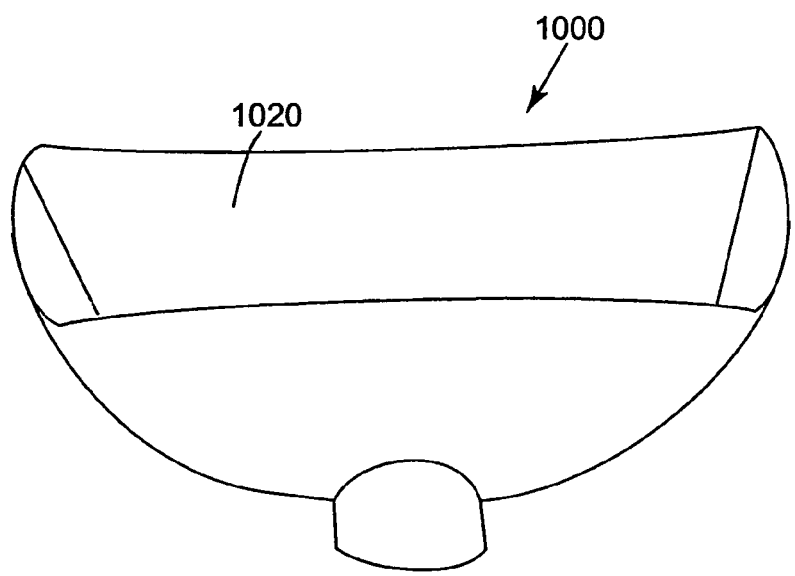
Figures 11A, 11B:
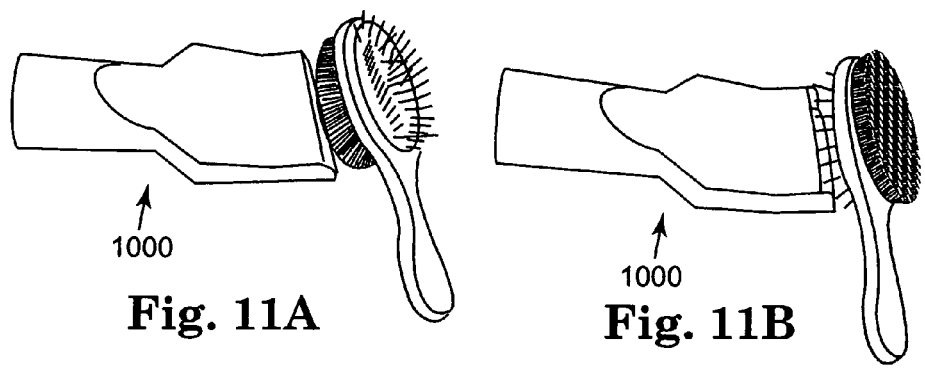
Figures 11C, 11D:
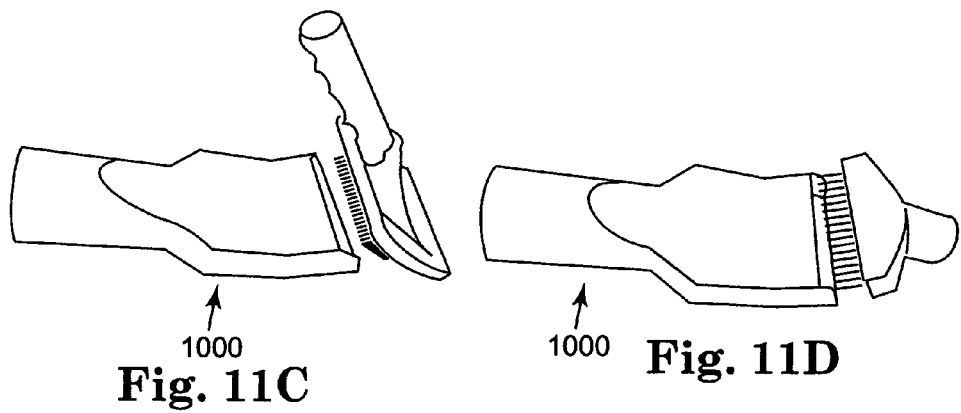
Figures 11E, 11F:
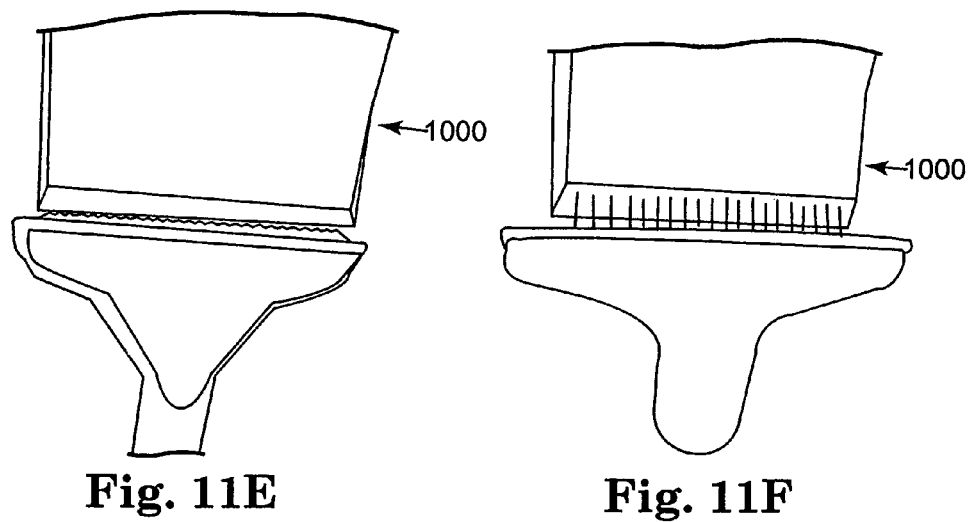

One embodiment is a static vacuum cleaner 1000 shown in FIGS. 10 and 11. A vacuum source (not shown) is adapted to a cleaner head 1010 having an opening 1020 at least the size (length) of most tools. The other dimension (width) is such that maximum airflow is created, yet the opening is adequate to easily accommodate any of the non-brush tools.

Brush tools are cleaned across the cleaner opening 1020, providing mechanical scrubbing action to facilitate the vacuum action. Non-brush tools are merely held in the vacuum cleaner opening 1020.

Disconnecting the source of vacuum from the vacuum tool before attempting to remove hair from the tool with the vacuum cleaner typically makes hair removal from said tool easier and more complete (vacuum sources and resultant airflow don't compete).

Figure 13A:
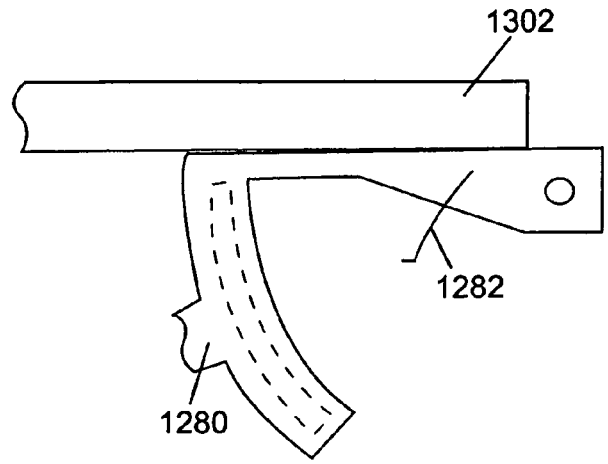
Figure 13B:
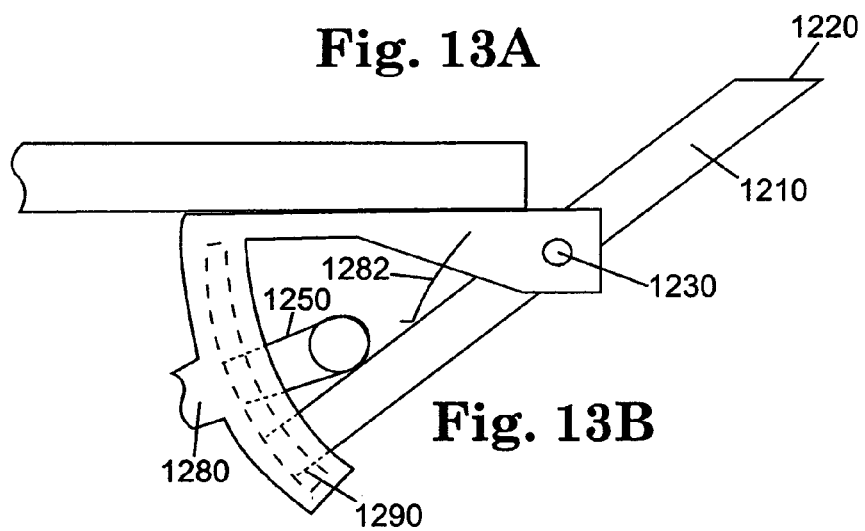

FIGS. 12 and 13 show one of many possible implementations of an articulated tool cleaner 1200 according to one aspect of the invention. The tool cleaner 1200 can be activated by placing the tool to be cleaned onto the cleaner opening 1220 of a movable vacuum plenum 1210 and pressing down, causing rotation of the cleaner about a pivot 1230 held in place by channels effectuating a rotational sliding mechanism similar to the action of a standard linear motion blast gate. This rotation effectively switches the vacuum source from a vacuum tool to the cleaner, allowing both the vacuum tool and cleaner to share the same vacuum source, but not simultaneously. This switches the vacuum off to the connected vacuum tool and on to the cleaner, such that the airflow through the cleaner does not have to compete with any vacuum or airflow through the tool to be cleaned (wiped). If a brush is used, the brush is wiped across the cleaner opening, (while pressing down) providing mechanical assistance to assist the vacuum in removing hair. Releasing the downward force causes a spring to return the cleaner to the original position (via counter-rotation about the pivot point).

An auxiliary vacuum device 1250 (AVD), shown in FIG. 12(B) is designed to split the vacuum source to it in order to provide vacuum outlets 1270 to either side of the movable vacuum plenum 1210. This provides flexibility in mounting the entire unit. The unused outlet port is plugged in normal operation. One of the many alternatives readily appreciated by one skilled in the art is a simple pipe "elbow" (not shown), providing tool attachment on only one side of the movable vacuum plenum 1210. Such pipe elbow could also be configured such that it could be rotated to provide tool attachment on either side of the movable vacuum plenum 1210.

Mechanical articulation and rotation can be minimized or eliminated by using a pressure or other switch to activate pneumatic (even vacuum-driven) or electrical motorized opening and closing of respective valves to achieve the same function as that described above.

In the preferred embodiment, the articulated brush scrubber is made up of the following: a fixed 2¼" vacuum plenum 1280, to which vacuum is continuously supplied; a moveable vacuum plenum 1210, which rotates up and down around a fixed pivot point 1230. One end of the moveable vacuum plenum 1210 has an opening 1220 having a width just larger than the width of the tool to be cleaned. The other end of the moveable vacuum plenum has a sliding vacuum seal 1290 (shown in FIG. 13(B) sealing off the fixed vacuum plenum).

Figure 13C:
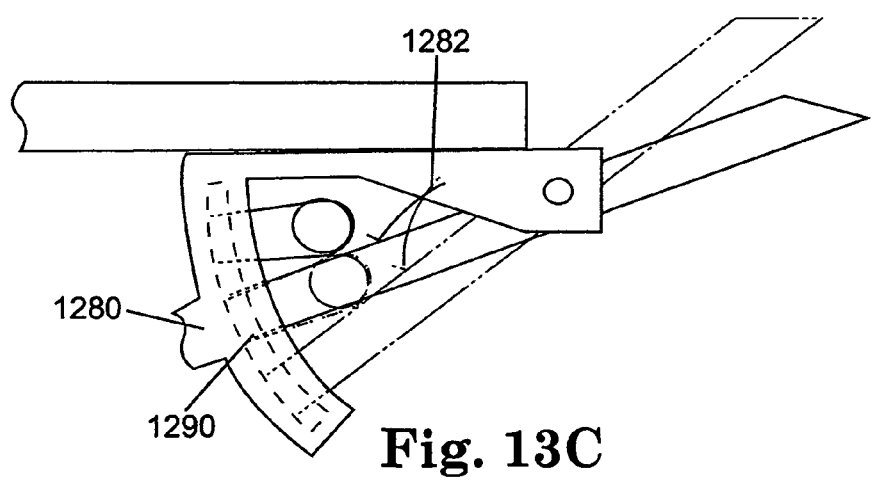

The device is activated by pushing the moveable vacuum plenum 1210 down with the tool to be cleaned. This action, as illustrated in FIG. 13(C), rotates the sliding vacuum seal 1290 off the fixed vacuum plenum 1280 and simultaneously rotates the previously open end of the moveable vacuum plenum 1210 to engage a seal with the fixed vacuum plenum 1280. This causes air flow through the moveable vacuum plenum 1210. It also stops or reduces air flow through the AVD 1250. The device being cleaned is then pushed across or inserted into the open end 1220 of the moveable vacuum plenum 1210 to release trapped hair, which is sucked up by the moveable vacuum plenum 1210, through the seal between moveable and fixed vacuum plenums and on to a vacuum source.

At the completion of the cleaning motion, pressure on the moveable vacuum plenum 1210 by the device being cleaned is released by lifting the device being cleaned. A return spring 1282 biases the moveable vacuum plenum 1210 back to the starting position, sealing off the vacuum from the fixed vacuum plenum 1280 to the moveable vacuum plenum 1210 and restoring full vacuum to the AVD 1250. This device could be used with any standard grooming tool as well as any of the vacuum tools (with vacuum still running to such). In the case of a shedding blade, comb, rake, or de-matting tool, the tool would be cleared of trapped hair simply by engaging the open end of the moveable vacuum plenum 1210, pushing both down. No aft-fore motion of the tool would be required—the trapped hair would be just sucked off. As for a non-vacuum assisted slicker, bristle or pin brush, wiping motion of a pin brush style vacuum tool would facilitate clearing of hair from the pins. Cleaning a vacuum tool connected to its vacuum source via the AVD 1250 gains the benefit of having its vacuum supply automatically stopped or reduced through such engagement of the open end of the movable vacuum plenum 1210, effectively disconnecting the AVD 1250, and hence the source of vacuum to the vacuum tool from fixed vacuum plenum 1280.

In the preferred embodiment, the device has a sufficient seal so that leakage is not a significant source of noise. Also, the seal remains adequate throughout many cycles. In addition the vacuum plenums are designed with aerodynamically smooth inner surfaces to avoid generation of noise. Finally, the entire tool cleaner is designed as a single unit that can easily be attached (with screws, etc.) to either the top or bottom of a grooming table 1302, or to a wall so to provide easy, natural access to such by any tool held in a groomer's hand.

With this implementation, a vacuum source could easily be shared between the tool cleaner and vacuum tools. Doing so may even make both tools work better. Full vacuum would be available to the vacuum tool when grooming. Activation of the tool cleaner would release some or all of the vacuum from the vacuum tool, making it that much easier for the tool cleaner to suck trapped hair off the vacuum tool. Full vacuum would be restored to the vacuum tool upon release of the tool cleaner. All of this action is accomplished with just the one hand holding the tool that is to be "scrubbed" of hair.

We claim:

1. An apparatus comprising:
   (a) a vacuum nozzle having a hollow body terminating in a mouth opening and attachable to a vacuum source; and
   (b) a grooming blade spanning the mouth opening, the grooming blade having a plurality of teeth on the sides of which are formed sharp edges, the grooming blade having two sides and positioned with respect to the mouth opening to allow negative airflow created by the vacuum source to flow over the two sides of the grooming blade, during grooming operations as the grooming blade is pushed or pulled across a pet's coat, the negative airflow lifts top coat hair of the pet's coat to expose undercoat hair to the sharp edges of the grooming blade which are configured to remove ready to be shed undercoat hair by snagging the ready to be shed undercoat hair thereby increasing efficiency of deshedding operations as compared to conventional deshedding operations by eliminating operational strokes and reducing time associated with the deshedding operations.

2. The apparatus of claim 1, wherein the grooming blade is made of stainless steel and the sharp edges are a result of a metal stamping process.

3. The apparatus of claim 1, wherein the grooming blade is molded from plastic.

4. The apparatus of claim 1, wherein the grooming blade is one of a plurality of grooming blades which are aligned in a substantially parallel manner.

5. The apparatus of claim 1, wherein an angle of engagement of the grooming blade can be set to a plurality of different orientations.

6. The apparatus of claim 1, wherein the sharp edges are burrs.

7. The apparatus of claim 6, wherein the burrs are formed by a manufacturing process.

8. The apparatus of claim 6, wherein the grooming blade is made of stainless steel and the burrs are a result of a metal stamping process.

9. An apparatus comprising:
   (a) a vacuum nozzle having a hollow body terminating in a mouth opening and attachable to a vacuum source; and
   (b) a grooming blade spanning the mouth opening, the grooming blade having formed thereon sharp edges, the grooming blade having two sides and positioned with respect to the mouth opening to allow negative airflow created by the vacuum source to flow over the two sides of the grooming blade, during grooming operations as the grooming blade is pushed or pulled across a coat of a pet, the negative airflow lifts top coat hair of the coat to expose undercoat hair to the sharp edges of the grooming blade which are configured to remove ready to be shed undercoat hair by snagging the ready to be shed undercoat hair thereby increasing efficiency of deshedding operations as compared to conventional deshedding operations by eliminating operational strokes and reducing time associated with the deshedding operations.

10. The apparatus of claim 9, wherein the grooming blade is made of stainless steel and the sharp edges are a result of a metal stamping process.

11. The apparatus of claim 9, wherein the grooming blade is molded from plastic.

12. The apparatus of claim 9, wherein the grooming blade is one of a plurality of grooming blades which are aligned in a substantially parallel manner.

13. The apparatus of claim 9, wherein an angle of engagement of the grooming blade can be set to a plurality of different orientations.

14. An apparatus comprising:
    (a) a vacuum nozzle having a hollow body terminating in a mouth opening and attachable to a vacuum source; and
    (b) a grooming blade spanning the mouth opening, the grooming blade having a plurality of peaks on the sides of which are formed sharp edges, the grooming blade having two sides and positioned with respect to the mouth opening to allow negative airflow created by the vacuum source to flow over the two sides of the grooming blade, during grooming operations as the grooming blade is pushed or pulled across a coat of a pet, the negative airflow lifts top coat hair of the coat to expose undercoat hair to the sharp edges of the grooming blade which are configured to remove ready to be shed undercoat hair by snagging the ready to be shed undercoat hair thereby increasing efficiency of deshedding operations as compared to conventional deshedding operations by eliminating operational strokes and reducing time associated with the deshedding operations.

15. The apparatus of claim 14, wherein the grooming blade is made of stainless steel and the sharp edges are a result of a metal stamping process.

16. The apparatus of claim 14, wherein the grooming blade is one of a plurality of grooming blades which are aligned in a substantially parallel manner.

17. The apparatus of claim 14, wherein an angle of engagement of the grooming blade can be set to a plurality of different orientations.

18. An apparatus comprising:
a handle;
one or more grooming blades having a plurality of teeth on the sides of which are formed sharp edges which are configured to remove ready to be shed undercoat hair by snagging the ready to be shed undercoat hair; and
one or more fasteners positioned to secure the handle to the one or more grooming blades in a manner allowing an angle formed between the handle and the one or more grooming blades to be set to one of a plurality of orientations.

19. An apparatus comprising:
(a) a vacuum nozzle having a hollow body terminating in a mouth opening and attachable to a vacuum source; and
(b) an animal grooming device spanning the mouth opening, the animal grooming device having two sides and positioned with respect to the mouth opening to allow airflow created by the vacuum source to flow over the two sides of the animal grooming device, during grooming operation as the animal grooming device is pushed or pulled across an animal's coat, the animal grooming device is configured to remove loose or ready to be shed hair from the animal's coat.

20. The apparatus of claim 19, wherein the hollow body includes a wall surrounding the mouth opening, and the animal grooming device is attached to the wall.

21. The apparatus of claim 20, wherein the animal grooming device includes a grooming blade having a serrated edge.

22. The apparatus of claim 21, wherein the grooming blade comprises a shedding blade.

23. The apparatus of claim 21, wherein the animal grooming device further comprises an additional blade, and wherein the additional blade and the grooming blade are spaced apart and substantially parallel to each other.

24. The apparatus of claim 19, wherein the animal grooming device includes a comb.

25. The apparatus of claim 19, wherein the animal grooming device comprises an undercoat rake.

26. The apparatus of claim 19, wherein the animal grooming device comprises a de-matting tool.

27. The apparatus of claim 19, wherein the vacuum source includes a vacuum port and a blower port, the vacuum port and the blower port being alternately attachable to the vacuum nozzle.

28. The apparatus of claim 19, wherein the vacuum nozzle defines a vent on the hollow body for reducing suction at the mouth opening.

29. The apparatus of claim 28, further comprising a valve positioned to regulate air flow through the vent.

* * * * *